(12) United States Patent
Matsuda

(10) Patent No.: US 6,225,987 B1
(45) Date of Patent: May 1, 2001

(54) DRAWING APPARATUS

(76) Inventor: Norio Matsuda, c/o Pioneer Electronic Corporation Kawagoe Works, 25-1, Aza Nishi-machi, Ohaza Yamada, Kawagoe-shi, Saitama (JP)

( * ) Notice: Subject to any disclaimer, the term of this patent is extended or adjusted under 35 U.S.C. 154(b) by 0 days.

(21) Appl. No.: 08/919,355

(22) Filed: Aug. 28, 1997

(30) Foreign Application Priority Data

Sep. 11, 1996 (JP) .................................................. 8-262392

(51) Int. Cl.$^7$ .................................................. G09A 5/00
(52) U.S. Cl. .......................................... 345/179; 345/156
(58) Field of Search .................................. 345/156–158, 345/179, 173–175

(56) References Cited

U.S. PATENT DOCUMENTS

| | | | |
|---|---|---|---|
| 3,490,059 | * 1/1970 | Paulsen et al. | 73/181 |
| 3,795,150 | * 3/1974 | Eckhardt | 74/5.47 |
| 4,667,182 | * 5/1987 | Murphy | 345/174 |
| 5,231,381 | * 7/1993 | Duwear | 345/174 |
| 5,576,727 | * 11/1996 | Rosenberg et al. | 345/179 |
| 5,701,140 | * 12/1997 | Rosenberg et al. | 345/156 |
| 5,880,714 | * 3/1999 | Rosenberg et al. | 345/156 |
| 5,905,489 | * 5/1999 | Takahama et al. | 345/175 |

* cited by examiner

*Primary Examiner*—Steven Saras
*Assistant Examiner*—Alecia D. Nelson
(74) *Attorney, Agent, or Firm*—Fish & Richardson P.C.

(57) ABSTRACT

A drawing apparatus which allows a user to select various writing sensations without experiencing an unnatural operational feeling. This drawing apparatus comprises operating device designed to be movable within predetermined space; detection device which detects a moving position of the operating device within the space; display device which displays an image according to a locus of the operating device based on a detection output of the detection device; and driving device which imparts a reaction force to the operating device in motion. As the operating device is moved along an imaginary surface in the space, the image according to the locus of the operating device is displayed, the detection device detects a moving speed and/or velocity or an output of a pressure sensor corresponding to each position of the operating device in the space, and the driving device imparts the reaction force according to a detection result from the detection device to the operating device.

14 Claims, 8 Drawing Sheets

IMAGINARY INPUT SURFACE
Fp 8
MOVING DIRECTION

Fct1

LOCUS
5

DRAWING APPARATUS

BACKGROUND OF THE INVENTION

1. Field of the Invention

The present invention relates to a drawing apparatus as a terminal device for inputting an image on the display screen of a display apparatus or the like of a computer.

2. Description of Related Art

There are known drawing apparatuses which are designed to detect characters, a figure or the like, drawn on a tablet as an imaginary paper using a pen-like input device, and to display what has been input on a display.

FIGS. 1A and 1B are schematic diagrams showing a conventional drawing apparatus. As shown in FIG. 1A, the drawing apparatus has an input pen 101 comprised of a coordinate indicator, and a plate-like tablet 102 comprised of a digitizer. As the input pen 101 is moved and slid on the tablet 102, the coordinates of the moving pen 101 are detected and are supplied to an unillustrated computer or the like so that the locus of the moving pen 101 is displayed on the display screen of a monitor or the like to draw whatever has been input.

The thickness (width) of the locus can be changed by drawing software which runs on the computer, so that a user can make drawing while properly selecting the thickness of the locus as needed.

Even though the thickness of the locus is selected from various types available, the sliding resistance of the input pen 101 with its core 103 slid on the tablet 102 does not vary and the touch or the writing sensation the user feel through his hand does not change. This gives the user awkward feelings in the drawing operation.

When one actually writes characters on paper with a writing brush or the like, he can write them while adjusting the thickness of a line by controlling the stroking pressure. With the use of the conventional input pen as shown in FIG. 1B, however, when the core 103 made of metal or the like is pressed against the tablet 102, the stroking pressure is detected by taking the deformation of a pressure sensor 104 as a change in electric capacitance. Since the deformation of the pressure sensor 104 is so subtle that there hardly is a stroke of the input pen to the tablet 102.

Further, the deformation characteristic of the input pen with respect to the level of the stroking pressure is fixed. Therefore, the user cannot sense a non-linear deformation characteristic of each writing brush with respect to the level of the stroking pressure, which the user feels through his hand when actually using various kinds of writing brushes, or the brush strength or the like which varies from one brush to another. Thus, the writing sensation does not change, which still gives the user awkward feeling in the drawing operation.

OBJECTS AND SUMMARY OF THE INVENTION

Accordingly, it is a primary objective of the present invention to provide a drawing apparatus which allows a user to select various writing sensations without experiencing an unnatural operational feeling.

According to the first aspect of this invention, a drawing apparatus comprises operating device designed to be movable within predetermined space; detection device which detects a moving position of the operating device within the space; display device which displays an image according to a locus of the operating device based on a detection output of the detection device; and driving device which imparts a reaction force to the operating device in motion, whereby as the operating device is moved along a virtual surface in the space, the image according to the locus of the operating device is displayed, the detection device detects a moving speed and/or velocity or an output of a pressure sensor corresponding to each position of the operating device in the space, and the driving device imparts the reaction force according to a detection result from the detection device to the operating device.

According to the second aspect of this invention, the drawing apparatus with the first aspect further comprises setting device which sets the virtual surface in the space; and as the operating device is moved along the virtual surface set by the setting device, the detection device detects the moving speed and/or velocity or the output of the pressure sensor corresponding to each position of the operating device in the space, and the driving device imparts the reaction force according to the detection result from the detection device to the operating device.

According to the third aspect of this invention, in the drawing apparatus with the second aspect, the virtual surface set by the setting device consists of an arbitrary surface including a plane.

According to the fourth aspect of this invention, any of the drawing apparatuses described above further comprises noise generation device; and as the operating device is moved along the virtual surface in the space, the detection device detects the moving speed and/or velocity or the output of the pressure sensor corresponding to each position of the operating device in the space, and the driving device imparts the reaction force according to the detection result from the detection device and a driving force according to a signal, generated by the noise generation device, to the operating device.

With the above structures, when a user moves the operating device along the virtual surface, the reaction force is generated by the driving device to permit the user to feel through his hand the force corresponding to the stroking pressure of a brush on the virtual surface, the writing friction, the dead weight of the brush, the roughness of the writing surface, etc. The user can therefore select various writing sensations without experiencing an awkward feeling in operating the drawing apparatus.

DETAILED DESCRIPTION OF THE PREFERRED EMBODIMENT

A preferred embodiment of the present invention will now be described with reference to the accompanying drawings.

Figure 1A:
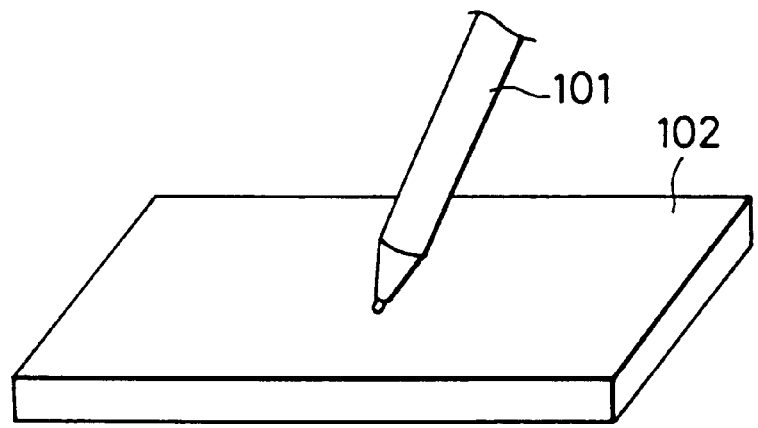
FIGS. 1A and 1B are schematic diagrams showing a conventional drawing apparatus.
Figure 1B:
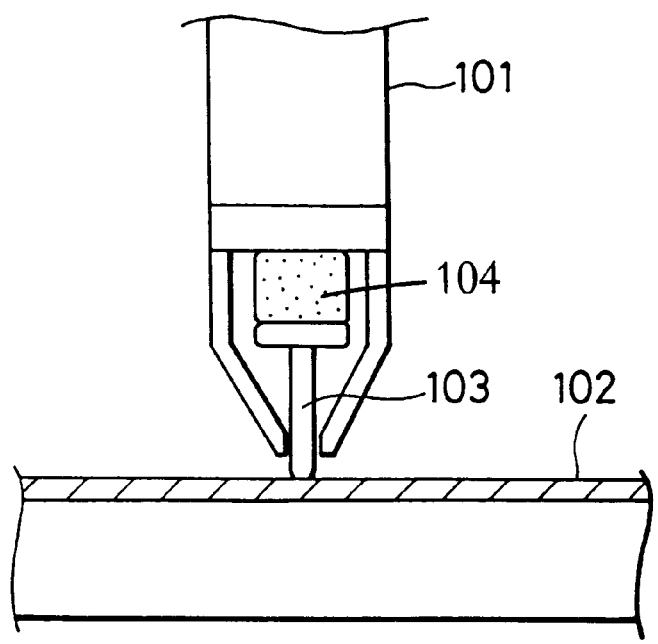
Figure 2:
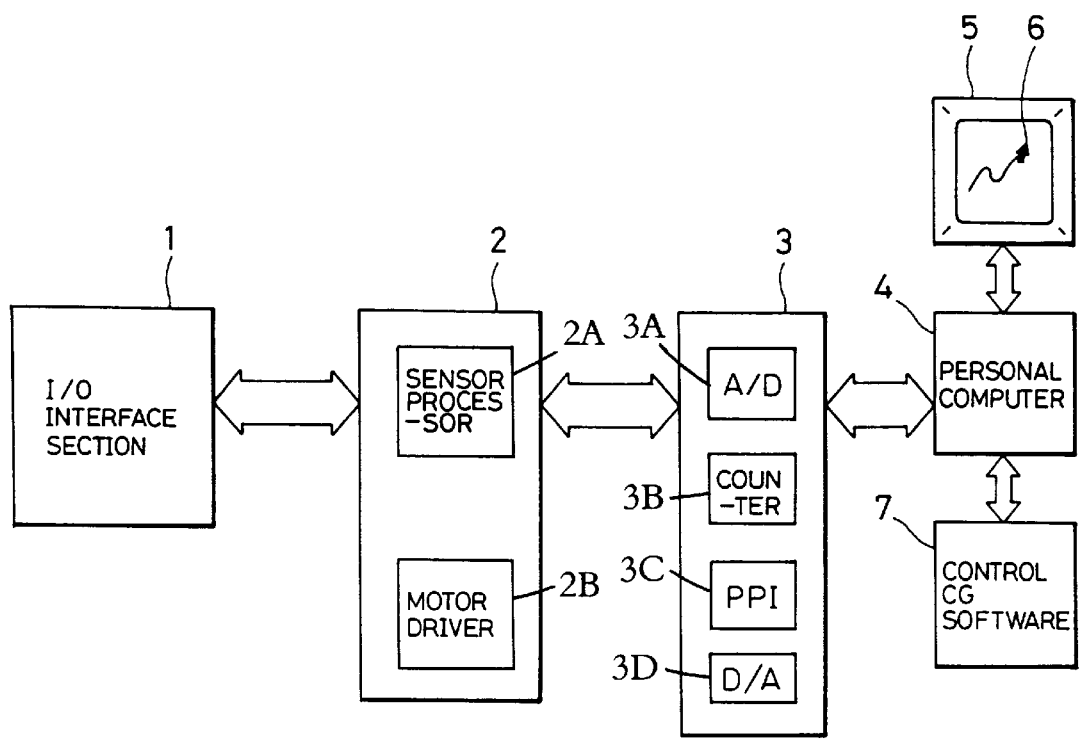
FIG. 2 is a schematic block diagram illustrating a drawing apparatus according to one embodiment of this invention.

FIG. 2 is a schematic block diagram of a drawing apparatus according to one embodiment of this invention. Referring to this figure, an input/output (I/O) interface unit 1 has an unillustrated operation grip. When a user moves the operation grip along an imaginary input surface, individual rotary encoders, which are coupled to the operation grip and provided in association with three axes crossing one another at right angles, detect the amount of movement of the operation grip in terms of the amounts of rotation of the individual coupling portions associated with the three axial directions and send detection signals to an I/O processing section 2 comprising a sensor processor 2A and a motor driver 2B.

The I/O interface unit 1 has setting device for permitting the user to select an imaginary input surface along the desired direction in the space that is defined by the three axes. For example, such an imaginary input surface may be set by previously designating the spatial coordinates of three points which constitute a plane, or selecting the desired one from a plurality of imaginary input surfaces that have already been set. Information on the setting is sent to the I/O processing section 2.

The I/O processing section 2 converts the amounts of rotation of the individual rotary encoders, provided in association with the three perpendicular axes, to the amounts of movement of coordinates on the set imaginary input surface to properly compute the amounts of movement of the coordinates of the operation grip on the imaginary input surface in accordance with the amounts of rotation of the individual rotary encoders.

Based on signals from the rotary encoders and the information on the setting of the imaginary input surface, both supplied from the I/O interface unit 1, motor control voltages for the amounts of rotation of the individual coupling portions are generated to drive motors (not shown), provided in association with the rotary encoders, at predetermined timings. As a result, a predetermined reaction force is applied to allow the operation grip of the I/O interface unit 1 to be movable on the set imaginary input surface. In addition, signals corresponding to the line thickness, the type of an imaginary pen, the roughness of the surface of imaginary paper and so forth, which have been selected by the user through control CG (Computer Graphics) software 7 are supplied to the operation grip in motion via a personal computer 4 and an interface board section 3. Based on those signals, motor control voltages are also generated to apply the corresponding reaction force to the operation grip.

The I/O processing section 2 supplies the signals, sent from the individual rotary encoders of the I/O interface unit 1, to the interface board section 3 comprising an A/D coverter 3A, a counter 3B, a PPI 3C, and a D/A converter 3D, one by one. As the operation grip moves, the interface board section 3 sequentially computes the moved distance and the moving direction of the operation grip on the imaginary input surface, i.e., the coordinates of the moved position of the operation grip based on the supplied signals, and sends digital signals, acquired by executing predetermined signal processing, to the personal computer 4.

Based on the supplied digital signals and in accordance with the control CG software 7, the aforementioned setting of the imaginary input surface and the level of the reaction force applied to the operation grip, the personal computer 4 displays a position indicator 6 corresponding to the imaginary input surface on the display screen of a monitor 5, and controls the display of the locus of the position indicator 6 in accordance with the movement of the operation grip on the imaginary input surface.

The structures of the individual sections of the I/O interface unit 1 will be discussed below.

Figure 3:
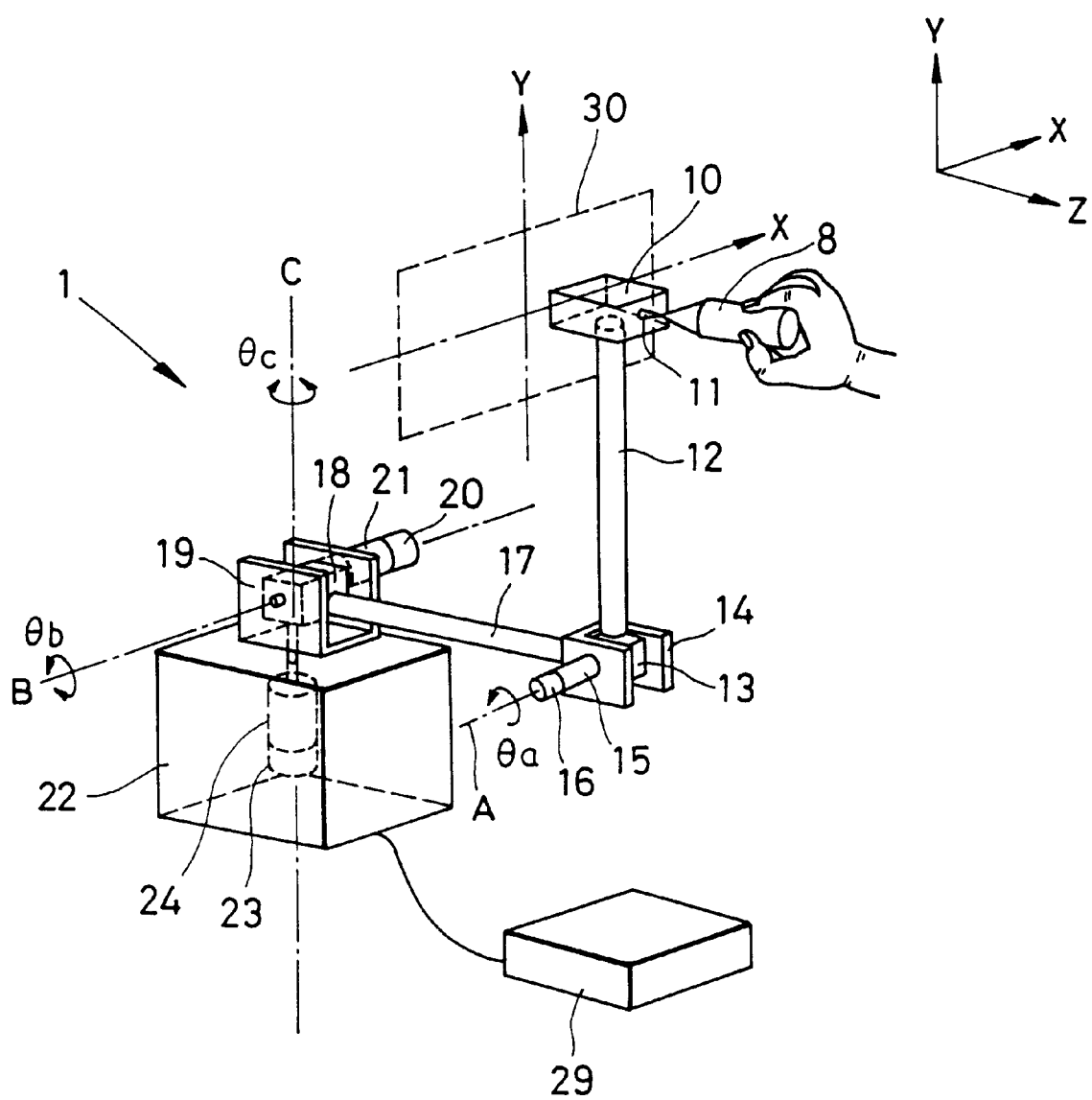
FIG. 3 is a schematic outline structural diagram of an input/output interface unit of the this embodiment of the drawing apparatus according to the present invention.

FIG. 3 presents a schematic outline structural diagram of the I/O interface unit 1. In this diagram, reference numeral "29" denotes setting device for setting an imaginary input surface. In the illustrated example, an imaginary input surface 30 is set as a plane along the X and Y axes in the spatial coordinates (X, Y, Z) in the aforementioned manner.

Figure 4:
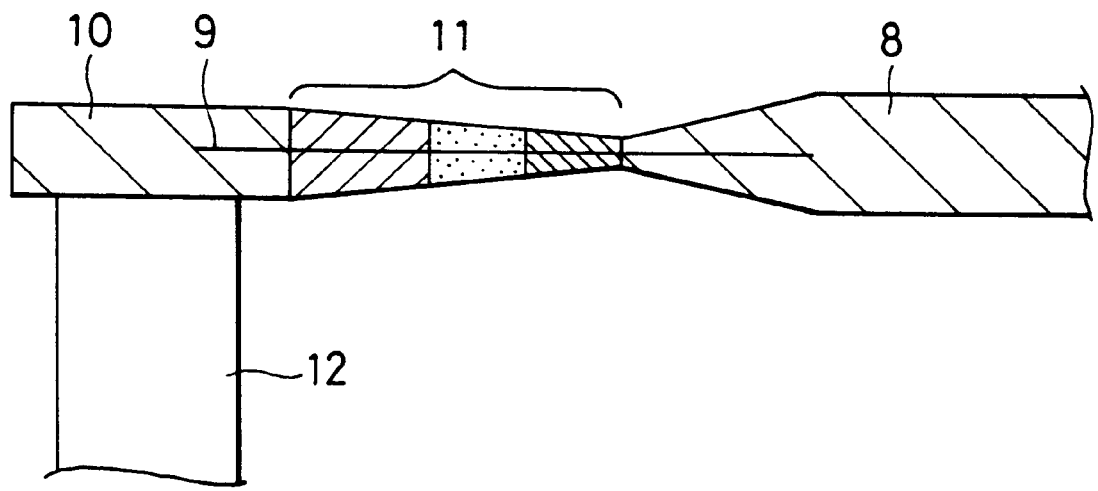
FIGS. 4 and 5 are detailed diagrams of an operation grip of the input/output interface unit of this embodiment of the drawing apparatus according to the present invention.
Figure 5:
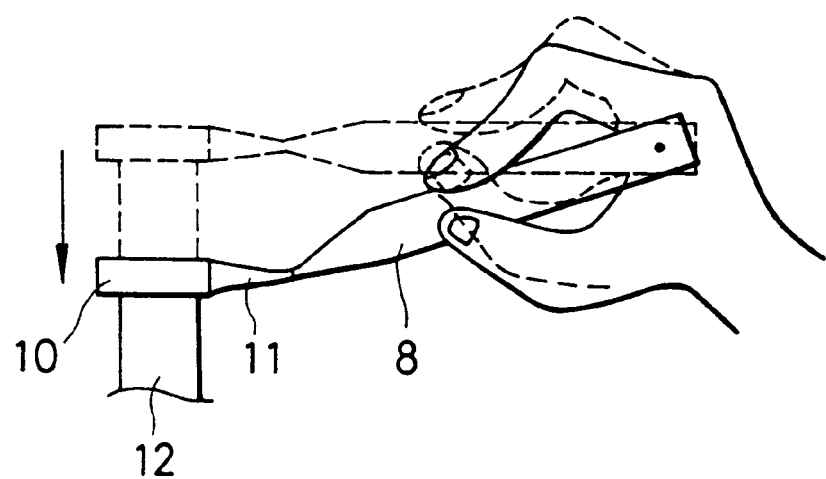

FIGS. 4 and 5 are detailed diagrams of an operation grip 8 of the I/O interface unit 1. As shown in FIG. 4, the I/O interface unit 1 has the operation grip 8 of nearly a rod shape, for example, which is coupled to a fixed section 10 via a wire 9 and a plurality of elastic members 11 to be supported like a cantilever.

The materials and shapes of the wire 9 and the elastic members 11 are so selected as to provide a relatively small stiffness, which permits the user to easily bend the operation grip 8, as shown in FIG. 5. The fixed section 10 is secured to one end of a stick 12.

As shown in FIG. 3, the other end of the stick 12 is secured to a coupling block 13 which is attached to an associated coupling base 14 to be rotatable around a center axis A in FIG. 3.

Attached to the rotational axis of the coupling block 13 is a rotary encoder 16 which consecutively detects the amount of rotation of the coupling block 13 that rotates around the axis A with respect to the coupling base 14, and sends the detection result to the I/O processing section 2 (not shown). The coupling block 13 is designed to be rotatable around the axis A by a motor 15 attached to the coupling base 14.

The coupling base 14 is secured to one end of a stick 17, which is formed along the axis A, while the other end of the stick 17 is secured to a coupling block 18. The coupling block 18 is attached to an associated coupling base 19 to be rotatable around a center axis B in FIG. 3.

Attached to the rotational axis of the coupling block 18 is a rotary encoder 20 which consecutively detects the amount of rotation of the coupling block 18 that rotates around the axis B with respect to the coupling base 19, and sends the detection result to the unillustrated I/O processing section 2. The coupling block 18 is designed to be rotatable around the axis B by a motor 21 attached to the coupling base 19.

The coupling block 19 is attached to a secured base 22 to be rotatable around a center axis C in FIG. 3. Attached to the rotational axis of the coupling base 19 is a rotary encoder 23 which consecutively detects the amount of rotation of the coupling base 19 that rotates around the axis C with respect to the base 22, and sends the detection result to the unillustrated I/O processing section 2. The coupling base 19 is designed to be rotatable around the axis C by a motor 24 attached to the base 22.

The motors 15, 21 and 24, like ultrasonic motors, have holding torques to hold the associated coupling blocks 13 and 18 and coupling base 19 not to rotate around the respective axes in the initial state. Therefore, the operation grip 8 does not move and can keep the current position unless force is externally applied. With electromagnetic motors in use as an alternative, the operation grip 8 can be set free in the initial state.

The motors 15, 21 and 24, connected to the I/O processing section 2 (not shown), are driven by the motor control voltage output from the I/O processing section 2 in accordance with the amounts of rotation of the associated coupling blocks 13 and 18 and coupling base 19 over a predetermined time, which are detected by the associated rotary encoders. As a result, a reaction force is applied to the operation grip 8 in motion.

According to the thus structured drawing apparatus embodying this invention, as the user moves the I/O interface unit 1 on an imaginary input surface, as desired, using the operation grip 8, the coupling blocks 13 and 18 and the coupling base 19 rotate around their respective axes. The rotary encoders 16, 20 and 23 provided in association with the axes in turn successively detect the amounts of rotation of the coupling blocks and base 13, 18 and 19 and send the detection results to the I/O processing section 2. In accordance with the detection results and information on the coordinates on the imaginary input surface that have been set previously by the I/O interface unit 1, the I/O processing section 2 drive the motors 15, 21 and 24 to impart the reaction force to the hand of the user manipulating the operation grip 8 whenever necessary. In addition, the I/O processing section 2 moves the position indicator 6 on the imaginary input surface, which is displayed on the display screen of the monitor 5, via the interface board section 3 and the personal computer 4 in accordance with the locus of the operation grip 8, and controls the display of the locus of the operation grip 8 based on the line thickness, the type of the imaginary pen, the roughness of the surface of imaginary paper and so forth, set by the control CG software 7, the setting of the imaginary input surface and the level of the reaction force applied to the operation grip 8.

A description will now be given of the reaction force that is applied by each motor to the operation grip which moves along the imaginary input surface. The reaction force that is imparted to the operation grip in motion is expressed as follows.

$$Fct1 = Fp + Fv + Fa + Fn$$

where Fct1 indicates the torque generated by each motor, Fp is the force corresponding to imaginary stroking pressure applied to the imaginary input surface (imaginary stroking pressure), Fv is the force corresponding to friction according to the relative speed of the imaginary pen and imaginary paper during drawing (the slidability of the imaginary pen on the imaginary paper), Fa is the force corresponding to the acceleration of the imaginary pen used in drawing (which includes the dead weight of the imaginary pen), and Fn is the force corresponding to the state of contact of the imaginary pen on the imaginary paper (imaginary roughness).

Fct1 is the sum of Fp, Fv, Fa and Fn, and the I/O processing section 2 supplies motor control voltages to the individual motors 15, 21 and 24 so that those motors are driven with forces corresponding to the individual components of the force in the directions of three axes (A, B and C) shown in FIG. 2, thereby applying the reaction force to the operation grip 8.

The force Fp corresponding to the imaginary stroking pressure to be applied to the imaginary input surface will be discussed next.

In drawing a line on actual paper using a writing brush or the like, for example, the thickness or the like of a character or line to be written can be determined by the perpendicular movement of the writing brush against the surface of the paper. That is, the thickness or the like of a character or line to be written becomes thicker as the brush is pressed against the paper harder, and it becomes thinner as the contact of the brush on the paper gets softer.

In this embodiment, the I/O processing section 2 or the interface board section 3 sequentially computes the position of the distal end of the operation grip 8 on the imaginary input surface using the coordinate system of the imaginary input surface or the individual rotary encoders. The line width is set in accordance with the computed positional coordinates and data on the line thickness selected by the control CG software 7 or data on the type of the imaginary pen.

Figure 6A:
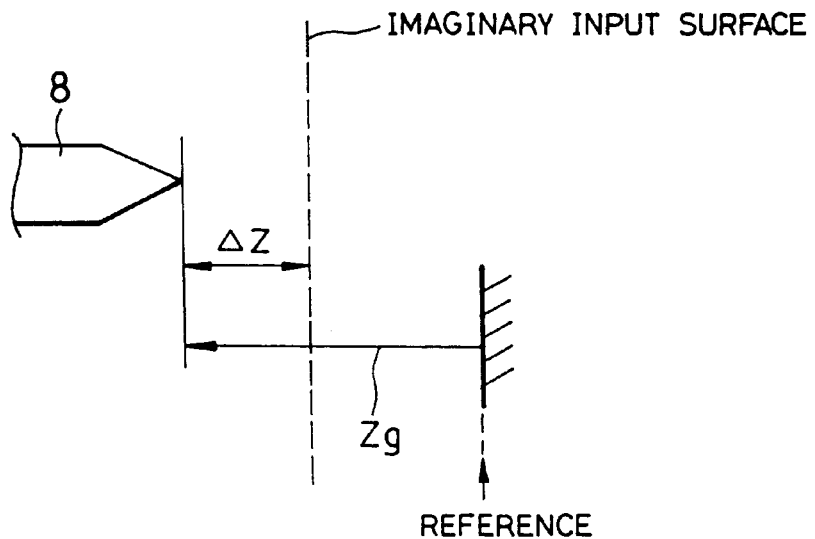
FIGS. 6A and 6B are diagrams exemplarily showing the position of the distal end portion of the operation grip with respect to an imaginary input surface in this embodiment of the drawing apparatus according to the present invention.
Figure 6B:
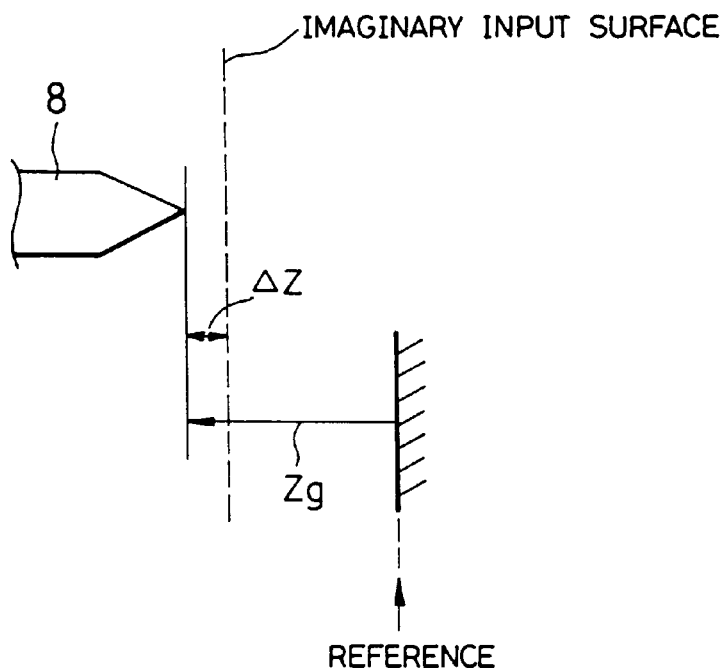

FIGS. 6A and 6B exemplarily show the position of the distal end of the operation grip 8 with respect to an imaginary input surface. FIG. 6A shows the case where the operation grip 8 is not in contact with the imaginary input surface, and FIG. 6B shows the case where the operation grip 8 is in contact with the imaginary input surface. In FIGS. 6A and 6B, the coordinates on an imaginary input surface are shown as those of a X-Y plane in the spatial coordinates (X, Y, Z), and the position of the distal end of the operation grip 8 on the imaginary input surface is indicated by the displacement of the Z axis.

As apparent from those diagrams, the I/O processing section 2 successively computes a change in the distance, Δz, between the imaginary input surface and the operation grip 8. When the computed result becomes equal to or smaller than a given value, the I/O processing section 2 can determine that the operation grip 8 is in contact with the imaginary input surface, and sends data on the line width according to the computed result to the interface board section 3 and generates, for each motor, a control voltage whose level accords to the computed result.

The data sent to the interface board section 3 is put through predetermined arithmetic operations and the resultant data is supplied to the personal computer 4. Accordingly, the thickness of the locus of the moving position indicator 6 on the monitor 5 is adjusted under the control of the control CG software 7.

Further, the individual motors are driven with the respective control voltages supplied thereto to control the operation grip 8 so that the reaction force is applied to the operation grip 8 along the Z axis in FIGS. 6A and 6B.

Figure 7A:
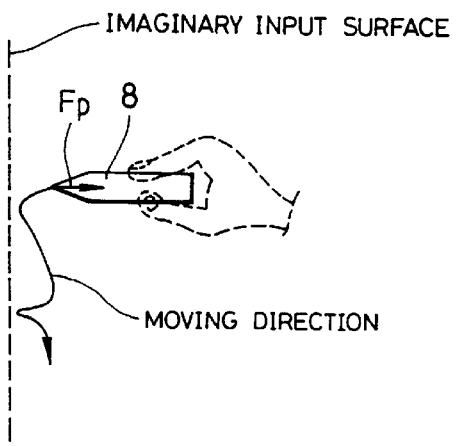
FIGS. 7A through 7C are diagrams exemplarily showing a locus drawn on the monitor in this embodiment of the drawing apparatus according to the invention.
Figure 7B:
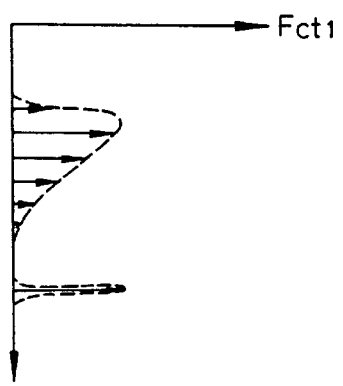
Figure 7C:
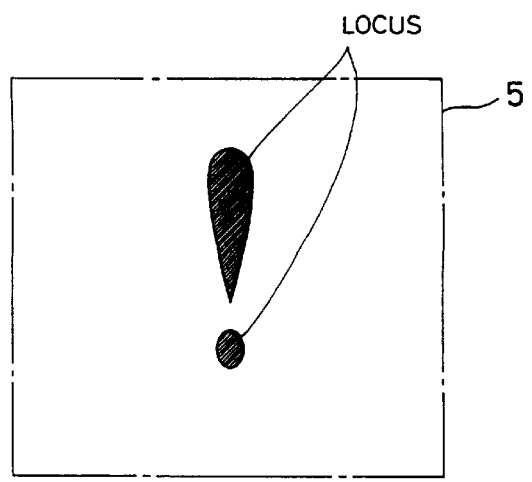

FIGS. 7A through 7C exemplarily show the force Fp corresponding to the reaction force which is successively generated as the user moves the operation grip 8 along the imaginary input surface while adjusting the stroking pressure, and shows an example of the locus which is drawn on the monitor 5 in this case.

The force Fv corresponding to the friction according to the relative speed of the imaginary pen to the imaginary paper during drawing will now be discussed.

In the case of drawing a line on actual paper using a felt pen or the like, for example, the friction of the felt pen varies between when the felt pen is moved slowly and when it is moved quickly. More specifically, the friction becomes relatively large when the felt pen is moved slowly, but it becomes relatively small when the pen is moved quickly. The friction which varies according to the stroking of the pen differs depending on the type of the pen selected and the condition or quality of paper in use.

In this embodiment, the I/O processing section 2 or the interface board section 3 sequentially computes the speed of the operation grip 8 moving along the set imaginary input surface and the positional coordinates representing the state of contact of the operation grip 8 to the imaginary input surface using the coordinate system of the imaginary input surface or the individual rotary encoders, based on data on the line thickness, the type of the imaginary pen, the roughness of the surface of the imaginary paper, etc. selected by the control CG software 7. Then, a control voltage for each motor whose level accords to the computed result is generated.

As the individual motors are driven with the respective control voltages supplied thereto, the operation grip 8 is so controlled as to receive the reaction force with respect to the moving direction and with the level according to the moving speed.

When the I/O processing section 2 determines that the distal end (reference position) of the operation grip 8 in motion is in contact with the imaginary input surface, the aforementioned reaction force is applied to the operation grip 8. When it is determined that the operation grip 8 is positioned apart from the imaginary input surface, the force Fv corresponding to the reaction force becomes zero. The coefficient value of the force Fv changes in accordance with the level of the aforementioned force Fp corresponding to the stroking pressure of the operation grip 8 in motion.

The force Fa corresponding to the acceleration of the imaginary pen to be used in drawing will now be described.

In the case of drawing a character on paper, for example, the weight of a writing implement the user feels varies between a fountain pen and a pencil due to the difference in their masses.

In this embodiment, the dead weight of the imaginary pen in use can be adjusted by applying the force Fa corresponding to the acceleration to the operation grip 8.

Based on data on the type of the imaginary pen, the mass of the imaginary pen, etc. selected by the control CG software 7, the I/O processing section 2 or the interface board section 3 regulates the control voltages to be supplied to the respective motors in such a way that the force Fa is applied to the distal end of the operation grip 8 in a predetermined direction. The motors are driven with those control voltages so that the force Fa always in one direction is applied to the operation grip 8. Therefore, the user manipulates the operation grip 8 while receiving the force Fa corresponding to the dead weight of the imaginary pen.

The force Fn corresponding to the state of contact of the imaginary pen to the imaginary input surface (imaginary roughness) will now be described.

In the case of drawing a character on actual paper using a pencil, for example, depending on the hardness of the lead of the pencil and the surface roughness of the paper, the user may feel the state of contact of the point (lead) of the pencil to the surface of the paper as rough through the hand holding the pencil. This is because as the hardness of the lead of a pencil increases or the surface roughness of paper increases, such rough feeling is obtained through a hand as vibration at a specific frequency component.

Figure 8:
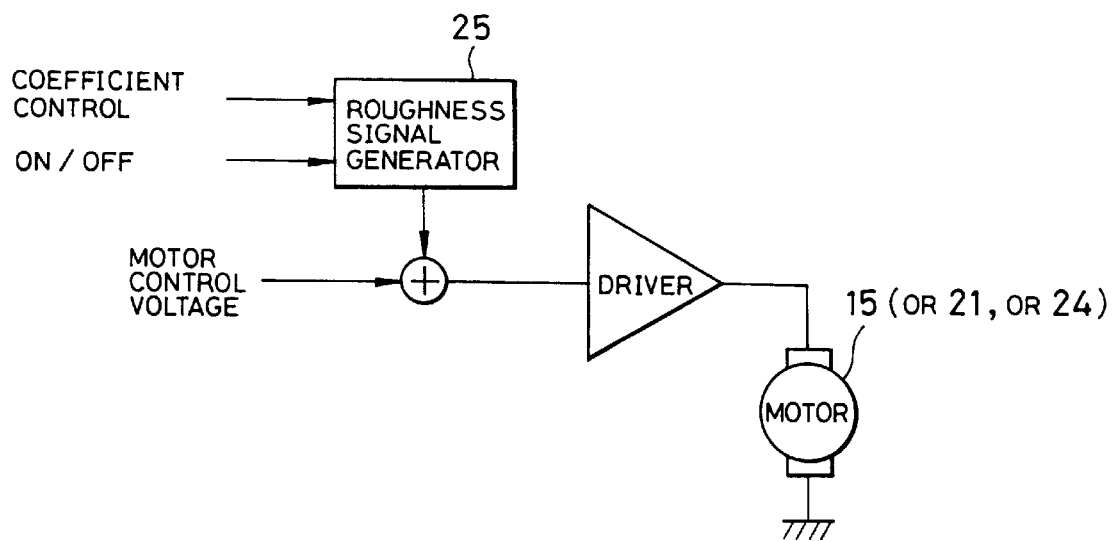
FIG. 8 is a diagram showing a roughness signal generator provided in this embodiment of the drawing apparatus.

In this embodiment, the I/O processing section 2 is provided with a roughness signal generator 25 shown in FIG. 8. The output signal of the roughness signal generator 25 is added to the control voltages generated for the individual motors to cause the motors to generate the components of the force Fn corresponding to the rough feeling. The force Fn obtained by combining those components of the force is applied to the moving operation grip 8 to impart the rough feeling.

Figure 9:
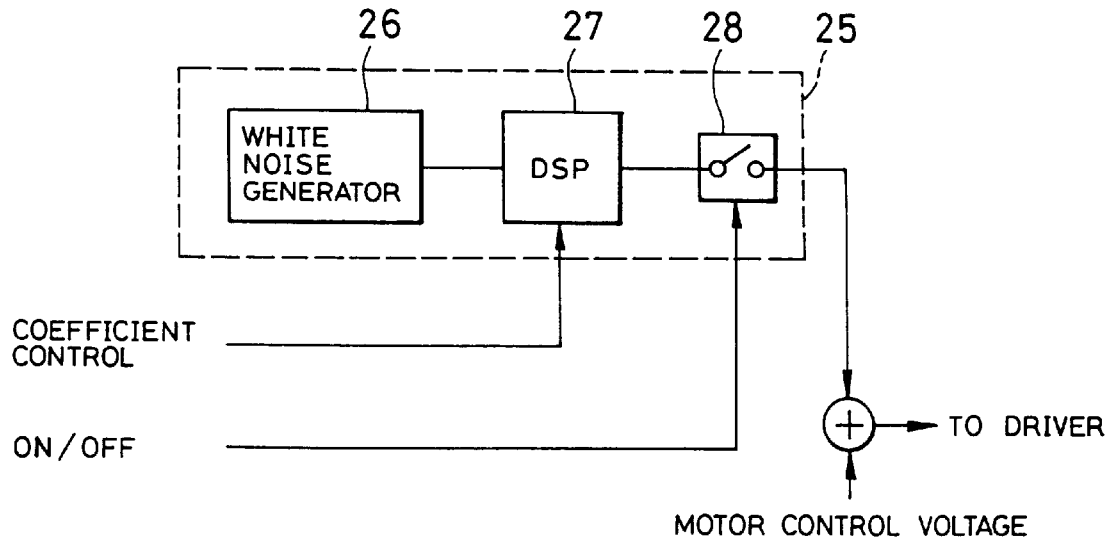
FIG. 9 is a diagram exemplarily showing the structure of the roughness signal generator in this embodiment.
Figure 10:
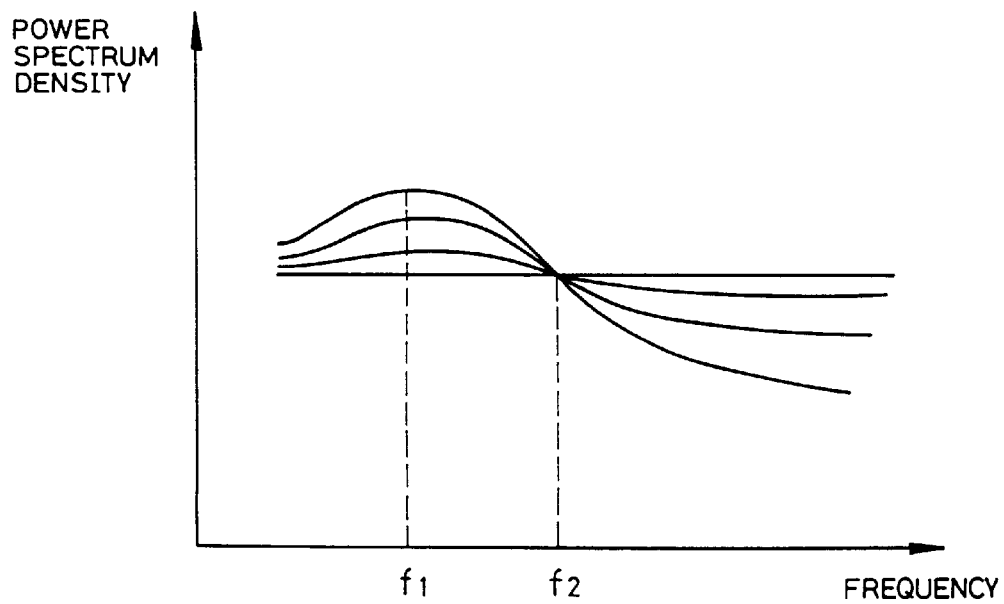
FIG. 10 is a diagram illustrating the frequency characteristic with respect to the power spectrum densities formed in individual modes by a DSP (Digital Signal Processor) of the roughness signal generator in this embodiment of the drawing apparatus.

FIG. 9 shows an example of the structure of the roughness signal generator 25. As illustrated, the roughness signal generator 25 is designed such that the power-spectrum density v.s. frequency characteristic of white noise generated by, a white noise generator 26, is adjusted by a DSP (Digital Signal Processor) 27, and is enabled or disabled by a switch 28. As a result, signals in individual modes, as shown in FIG. 10, are added to the control voltage for each motor as needed.

The modes of the DSP 27 are acquired through coefficient control in association with the surface of the imaginary paper and the type of the imaginary pen, which are controlled by the control CG software 7. The modes of the DSP 27 to be switched are not limited to those illustrated in FIG. 10, but may be changed in accordance with the moving speed of the operation grip 8.

When the I/O processing section 2 determines that the distal end (reference position) of the operation grip 8 is positioned apart from the imaginary input surface, as in the aforementioned case of the force Fv, the I/O processing section 2 sets the switch 28 off so that the user does not feel the roughness.

Instead of acquiring the force from acceleration, the force may be detected directly by device of a strain gauge provided at the stick 7.

With the above structures, when a user moves the operating device along an imaginary surface, the reaction force is generated by the driving device to permit the user to feel through his hand the force corresponding the stroking pressure of a brush on the imaginary surface, the writing friction, the dead weight of the brush, the roughness of the writing surface, etc. The user can therefore select various writing sensations without experiencing an awkward feeling in operating the drawing apparatus.

The present invention has been described above with reference to the preferred embodiment thereof. It should be understood that various modifications and variations can be made by those skilled in the art and that all such modifications and variations are included in the scope of the appended claims.

What is claimed is:

1. A drawing apparatus comprising:

operating device designed to be movable within predetermined space;

detection device which detects a moving position of said operating device within said space;

display device which displays an image according to a locus of said operating device based on a detection output of said detection device;

driving device comprising three motors that generate rotational torques corresponding respectively to reaction forces in three axial directions for imparting said reaction forces to said operating device in motion; and noise generation device, wherein as said operating device is moved along an imaginary surface in said space, said image according to said locus of said operating device is displayed, said detection device detects a moving speed and/or acceleration corresponding to each position of said operating device in said space, and said driving device imparts the reaction forces according to a detection result from said detection device and a noise signal generated by said noise generation device, to said operating device.

2. The drawing apparatus according to claim 1, further comprising setting device which sets said imaginary surface in said space; and wherein as said operating device is moved along said imaginary surface set by said setting device, said detection device detects said moving speed and/or acceleration corresponding to each position of said operating device in said space, and said driving device imparts the reaction forces according to said detection result from said detection device to said operating device.

3. The drawing apparatus according to claim 2, wherein said imaginary surface set by said setting device consists of an arbitrary surface including a plane.

4. A drawing apparatus comprising:

operating device designed to be movable within predetermined space;

detection device which detects a moving position of said operating device within said space;

display device which displays an image according to a locus of said operating device based on a detection output of said detection device;

driving device which imparts a reaction force to said operating device in motion; and noise generation device;

wherein as said operating device is moved along an imaginary surface in said space, said image according to said locus of said operating device is displayed, said detection device detects a moving speed and/or acceleration corresponding to each position of an operating device in a space, and said driving device imparts the reaction forces according to a detection result from said detection device and a noise signal generated by said noise generation device, to said operating device.

5. The drawing apparatus of claim 1, wherein said detection device can detect an output of a pressure sensor corresponding to each position of said operating device in said space.

6. The drawing apparatus according to claim 1, wherein said noise generation device is adapted to control the frequency characteristics of a power-spectrum density of said noise signal.

7. The drawing apparatus according to claim 1, wherein said noise generation device is adapted to control a switch to turn said noise signal on or off.

8. The drawing apparatus according to claim 1, said noise generation device comprising:

a white noise generator for producing a white noise signal; and a digital signal processor for adjusting said white noise signal, said adjusted white noise signal being used to impart roughness to the imaginary surface.

9. The drawing apparatus according to claim 8, said noise generation device further comprising a switch for turning said adjusted white noise signal on or off.

10. The drawing apparatus according to claim 9, wherein said switch turns off the adjusted white noise signal when the operating device is detected to be outside the imaginary surface.

11. A drawing apparatus comprising:

operating device designed to be movable within predetermined space;

detection device which detects a moving position of said operating device within said space;

display device which displays an image according to a locus of said operating device based on a detection output of said detection device;

driving device comprising three motors that generate rotational torques corresponding respectively to reaction forces in three axial directions for imparting said reaction forces to said operating device in motion; and white noise generation device comprising a white noise generator for producing white noise and a digital signal processor for adjusting the white noise;

wherein as said operating device is. moved along an imaginary surface in said space, said image according to said locus of said operating device is displayed, said detection device detects a moving speed and/or acceleration corresponding to each position of said operating device in said space, said driving device imparts the reaction forces according to a detection result from said detection device and the adjusted white noise signal generated by said white noise generation device, to said operating device; and said adjusted white noise signal is used to impart roughness to the imaginary surface.

12. The drawing apparatus according to claim 11, wherein said digital signal processor is adapted to control the frequency characteristics of a power-spectrum density of said white noise signal.

13. The drawing apparatus according to claim 11, said white noise generation device further comprising a switch for turning the adjusted white noise signal on or off.

14. The drawing apparatus according to claim 13 wherein said switch turns off the adjusted white noise signal when the operating device is detected to be outside the imaginary surface.

* * * * *